Sept. 21, 1926.
C. M. FORD ET AL
1,600,626
VEHICLE BRAKE
Filed Dec. 22, 1924   2 Sheets-Sheet 2
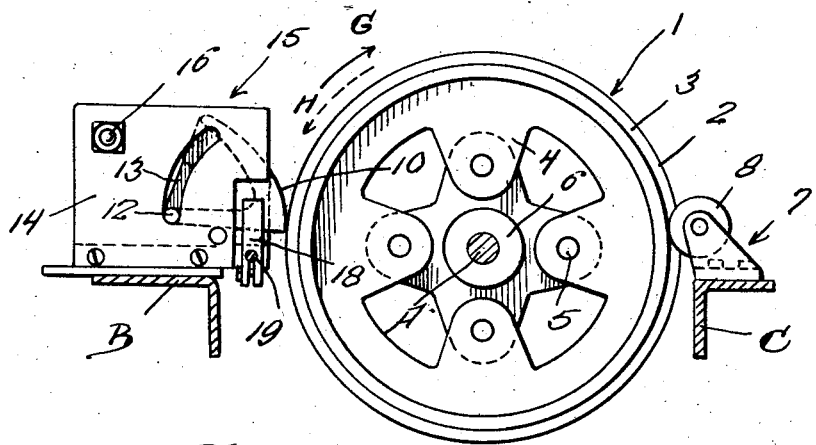
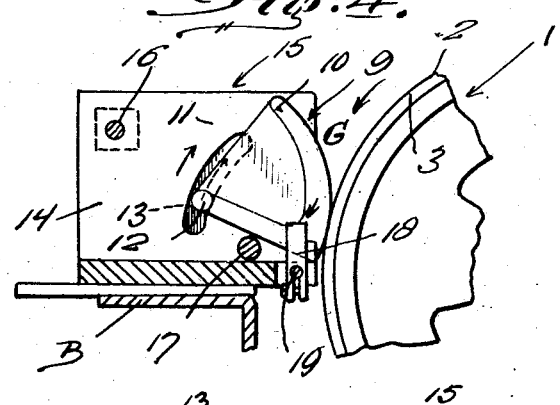
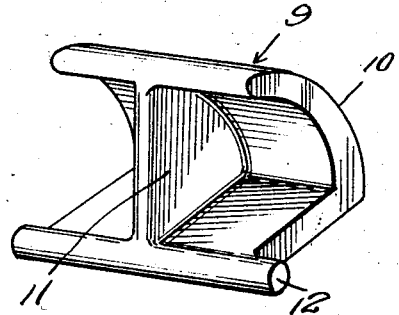
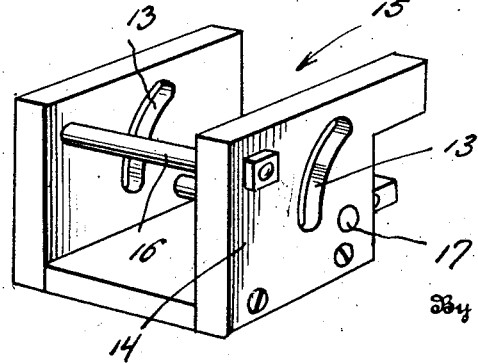
Inventors
C. M. Ford,
Walter Fox,
By
Attorney Patented Sept. 21, 1926.

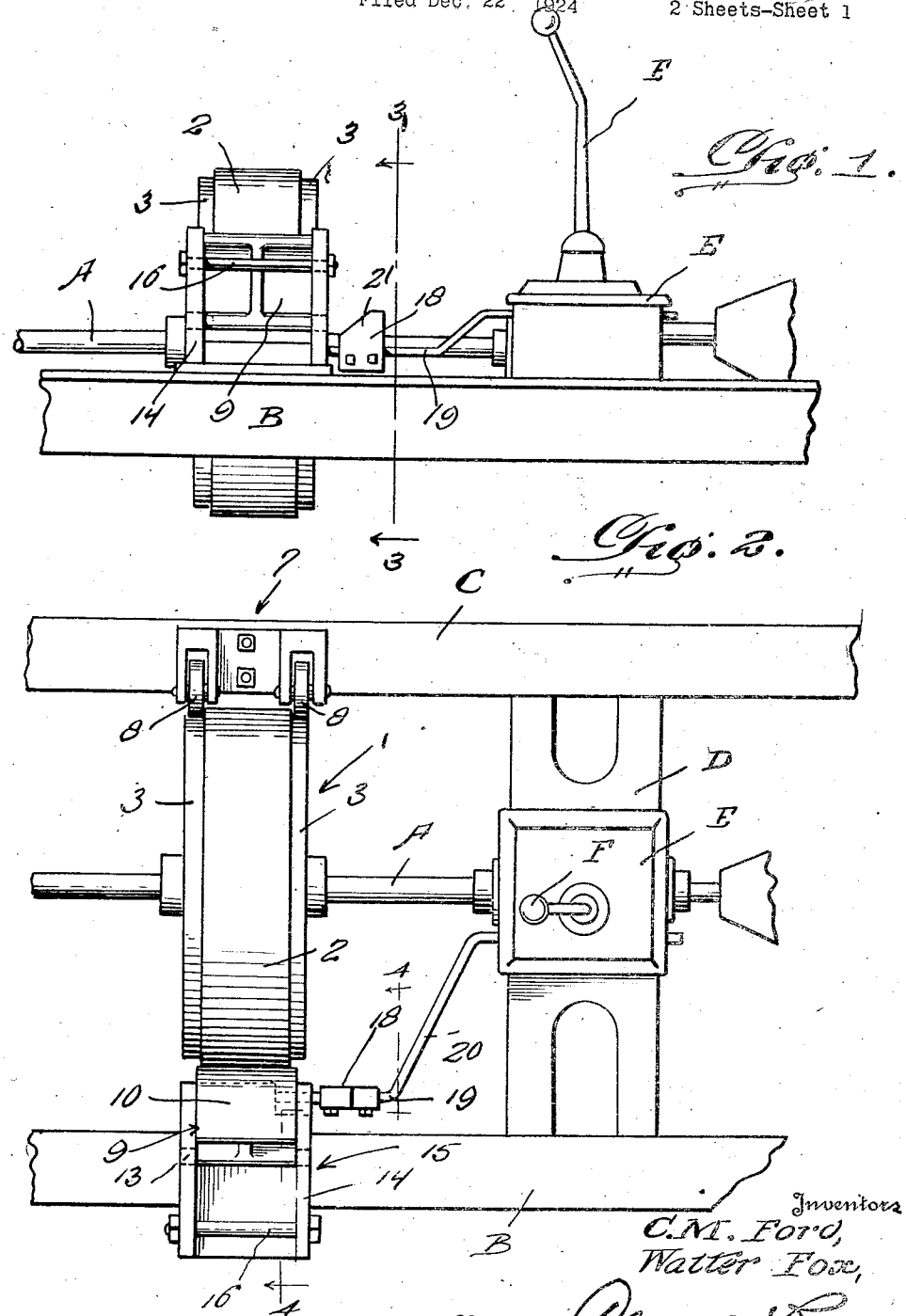

1,600,626

UNITED STATES PATENT OFFICE.

CECIL M. FORD AND WALTER FOX, OF JUNCTION CITY, OREGON.

VEHICLE BRAKE.

Application filed December 22, 1924. Serial No. 757,443.

This invention relates to an improved brake for vehicles, and particularly for automobiles, trucks, and the like.

More specifically speaking, the invention has reference to an improved brake, which is adapted to be mounted upon the propeller shaft, to be used more particularly when the vehicle is brought to a stop on an inclined surface, such as a hill, to prevent the same from rolling down the grade.

The object of the invention is, of course, to generally improve upon devices of this class, by providing one of comparative simplicity and durability which is such in construction, that a practical structure is absolutely assured.

It is a feature of the invention, for instance to provide a structure which is in the form of an attachment that can be applied to the existing parts of the vehicle, without requiring alterations or rearrangement of the parts.

Broadly, the invention comprises a rotor, which is fixed to the propeller shaft; means mounted on one of the chassis bars for guiding the rotor, and relieving tortional twists, together with an automatically operable brake shoe, which permits unhampered rotation of the rotor, in a direction to permit free movement of the vehicle, but serves to stop it from rotating, when the propeller shaft moves in a retrograde direction.

The specific details and arrangement thereof and advantages derived from their use will become apparent from the following description and drawings.

In the accompanying drawings, forming a part of this application, and in which like numerals are employed to designate like parts throughout the same:

Figure 1 is a side elevational view of conventional parts of an automobile, showing my improved attachment in association therewith.

Figure 2 is a top plan view of the structure seen in Figure 1.

Figure 3 is a sectional view, taken substantially upon the plane of the line 3—3 of Figure 1, looking in the direction of the arrows.

Figure 4 is a slightly enlarged fragmentary detail view, showing the relation of certain details more clearly, the section being taken approximately on the line 4—4 of Figure 2.

Figure 5 is a perspective view of the brake shoe, and

Figure 6 is a perspective view of the shoe mounting.

In the drawings, the reference character A designates the propeller shaft of a motor vehicle, on opposite sides of which are side bars B and C of the vehicle chassis frame. Extending between the side bars of the frame is a cross piece D, upon which the mounting E is secured for supporting a conventional gear shifting lever F. Other details are shown, but these need not be mentioned. It is of course understood that the details set out in this paragraph do not constitute any part of the present invention.

Referring to the invention in detail, it will be seen that the aforesaid rotor is generally designated by the reference character 1. While this rotor could be of some other construction, it preferably comprises a rim having a thickened central portion 2, which may be termed a braking surface, the reduced portion on opposite sides of this surface forming runways 3. The web, which extends inwardly from the rim, embodies circumferentially spaced extensions 4, which are bolted or otherwise detachably connected with the ears 5 radiating from the hub 6, this hub being fixedly secured to the aforesaid shaft A, and normally rotates with the shaft, in the direction of the arrow G. For the purpose of steadying the rotor, and relieving it of undue strains, we mount a U-shaped bracket 7 on the side bar C, opposite the rim of the rotor. This bracket may be bolted or otherwise secured in place. It is fashioned to accommodate a pair of small guide rollers 8, which are spaced apart for reception of the runway 3.

The braking mechanism comprises an especially shaped shoe 9, which is substantially V-shaped in general configuration. The shoe (seen better in Figure 5), preferably comprises an arcuate braking surface 10, of a width slightly greater than the width of the surface 2 of the rotor (see Figure 2). In addition, the shoe includes a reinforcing web 11, and a cylindrical pin 12, having its ends extending beyond the body portion, to provide journals. These journals are slidably mounted in vertically disposed arcuate slots 13, formed in the opposed horizontally spaced side plates 14 of the shoe mounting member 15. This mounting is secured in any appropriate way to the side bar B opposite the braking surface of the rotor. The side plates 14 are held and properly braced, by a bolt 16, which may, in some instances, serve as a stop, for rendering the braking shoe limitaneously movable, in one direction. Extending between the side plates and disposed beneath the flattened horizontal portion of the brake shoe is a stop pin 17. This limits the downward swinging movement of the shoe, serves as a fulcrum therefor, and maintains it normally in the proper position, to permit free rotation of the rotor, in the direction of the arrow G. Thus, it will be seen that the brake shoe is not effective, while the rotor is travelling with the propeller shaft, in the direction just named. It is obvious, however, that should the rotor move in a retrograde direction, as indicated by the arrow H, then the brake shoe will rock about the fulcrum pin 17 and take the approximate full line position, indicated in Figure 4, producing a braking action and immediately stopping the rotary movement of the propeller shaft. Thus, the vehicle will be brought to a standstill. During this action, it is also clear that the pintles or journals of the shoe will travel upwardly in the arcuate slots 13, producing a cam action which will bind the shoe tightly against the rotor.

It is desirable to provide means for swinging the brake shoe clear of the braking surface of the rotor, so that the mechanism will not interfere with the rotation of the propeller shaft, in the direction of the arrow H, in any way, in case it is desired to purposely move the vehicle in a reverse direction. The means provided comprises a shoe lifting block 18, detachably and adjustably clamped on the end portion 19 of the diagonally disposed longitudinally shiftable rod 20. The opposite end of this rod is connected (in a manner not shown), with the gear shifting lever F. As better shown in Figure 1, one corner of the upper edge of the block is bevelled as at 21, and it is obvious that when the gear shifting lever is moved to "reverse" speed, the inclined surface 21 of the block will ride beneath the brake shoe and lift it upwardly to swing it clear of the rotor.

From the foregoing it will be seen that we have evolved and produced a comparatively simple automatically acting device, acting in an effective manner as a brake for preventing retrograde motion of a vehicle, on a down grade, and that we have provided novel means, controlled by the gear lever, for temporarily rendering the improved device inoperative. It is thought, however, that the method of operation and the construction and arrangement of details will be clear from the foregoing description, and drawings. For this reason a more lengthy description is deemed unnecessary.

Although we have shown and described the preferred embodiment of the invention, we nevertheless wish it understood that any changes coming within the scope of the adjoined claims may be resorted to, if desired.

We claim:

1. In a structure of the class described, a rotor having a braking surface, guide rollers disposed opposite the periphery of the rotor and riding upon said periphery, and a brake shoe disposed opposite the braking surface of the rotor, for permitting unhampered movement of the same in one direction, and for automatically preventing rotation in the opposite direction.

2. In a structure of the class described, a rotor having a braking surface, guide rollers disposed opposite the periphery of the rotor and riding upon said periphery, a brake shoe disposed opposite the braking surface of the rotor for permitting unhampered movement of the same in one direction and for automatically preventing the rotation in the opposite direction, and cam co-acting means active upon said shoe.

3. In a structure of the class described, a hub adapted to be fixed upon a propeller shaft, a rotor connected to said hub, said rotor having peripheral guide grooves, guide rollers in association with said rotor and received in said grooves, a mounting, a brake shoe in association with said mounting, said brake shoe having an arcuate surface for contacting the braking surface of the rotor, said mounting being provided with cam slots, and said shoe having journals slidably mounted in said slots.

4. In a structure of the class described, a hub adapted to be fixed upon a propeller shaft, a rotor connected to said hub, said rotor having peripheral guide grooves, guide rollers in association with said rotor and received in said grooves, a mounting, a brake shoe in association with said mounting, said brake shoe having an arcuate surface for contacting the braking surface of the rotor, said mounting being provided with cam slots and said shoe having journals slidably mounted in said slots, and means adapted to be controlled by a gear shifting lever for rendering said brake shoe entirely ineffective.

5. A device of the class described comprising a rotor adapted to be fixedly mounted upon a propeller shaft, an automatically operable brake shoe cooperable with the braking surface of said rotor, mounting means for the shoe embodying a combined stop and fulcrum with which said shoe is cooperable, and cam co-acting means between the shoe and the mounting.

6. A device of the class described comprising a rotor adapted to be fixedly mounted upon a propeller shaft, an automatically operable brake shoe cooperable with the braking surface of said rotor, mounting means for the shoe embodying a combined stop and fulcrum with which said shoe is cooperable, and cam co-acting means between the shoe and the mounting, a lifting block disposed parallel to the axis about which said shoe fulcrums, and a longitudinally shiftable rod upon which said block is mounted, said block being adapted to move beneath said shoe for lifting it upwardly to dispose it in an inoperative position.

7. A structure of the class described comprising a rotor adapted to be fixedly mounted upon a propeller shaft, said rotor having peripheral guide grooves between which is a braking surface, guide rollers mounted opposite the periphery of the rotor and received in said grooves, a mounting disposed on the opposite side of the rotor, a combined stop and fulcrum pin carried by said mounting, a brake shoe in association with the mounting, said brake shoe having an arcuate surface for contacting the braking surface of the rotor, said mounting being provided with cam slots, and the shoe having journals slidable in said slot, a longitudinally shiftable rod disposed at right angles to the direction of movement of the shoe, and a lifting block carried by said rod and cooperable with said shoe.

In testimony whereof we affix our signatures.

CECIL M. FORD.
WALTER FOX.